United States Patent [19]
Chiaroni et al.

[11] Patent Number: 6,151,146
[45] Date of Patent: Nov. 21, 2000

[54] METHOD AND APPARATUS FOR SHAPING A BINARY SIGNAL

[75] Inventors: Dominique Chiaroni, Antony; Corinne Chauzat, Creteil; Michel Sotom, Paris; Dominique de Bouard, Ste-Geneviève-des-Bois, all of France

[73] Assignee: Alcatel, Paris, France

[21] Appl. No.: 09/057,545

[22] Filed: Apr. 9, 1998

[30] Foreign Application Priority Data

Apr. 10, 1997 [FR] France .................................. 97 04404

[51] Int. Cl.[7] .................................................. H04B 10/00
[52] U.S. Cl. .......................... 359/158; 359/181; 375/355
[58] Field of Search .................................. 359/133, 140, 359/158, 181, 184; 341/13, 137; 375/355

[56] References Cited

U.S. PATENT DOCUMENTS

| | | | |
|---|---|---|---|
| 4,473,901 | 9/1984 | Jensen | 359/158 |
| 5,329,393 | 7/1994 | Huang | 359/135 |
| 5,555,119 | 9/1996 | Lewis | 359/158 |

FOREIGN PATENT DOCUMENTS

| | | |
|---|---|---|
| 6861894 | 2/1995 | Australia . |
| 0635991A1 | 1/1995 | European Pat. Off. . |
| 0746070A1 | 12/1996 | European Pat. Off. . |

OTHER PUBLICATIONS

Patent Abstracts of Japan, vol. 018, No. 213 (E–1538), Apr. 15, 1994 corresponding to JP 06 013981 A (Nippon Telgr & Telph Corp) dated Jan. 21, 1994.

R. S. Tucker et al, "Optical Time–Division Multiplexing for Very High Bit–Rate Transmission", Journal of Lightwave Technology, New York, NY, US, vol. 6, No. 11, Nov. 1988, pp. 1737–1749.

*Primary Examiner*—Kinfe-Michael Negash
*Attorney, Agent, or Firm*—Sughrue, Mion, Zinn, Macpeak & Seas, PLLC

[57] ABSTRACT

In order to re-synchronize and shape a binary signal of bit time T0, a method includes forming a number p of sampled signals obtained by causing the signal to modulate pulses that are of frequency 1/T0 and of duration substantially equal to T0/p, and that are carried by p optical carriers having different wavelengths. The method also includes combining delayed signals that are obtained by applying delays to the sampled signals, such that any two consecutive delayed signals are offset in time by T0/p. The method applies to optical communications systems.

10 Claims, 4 Drawing Sheets

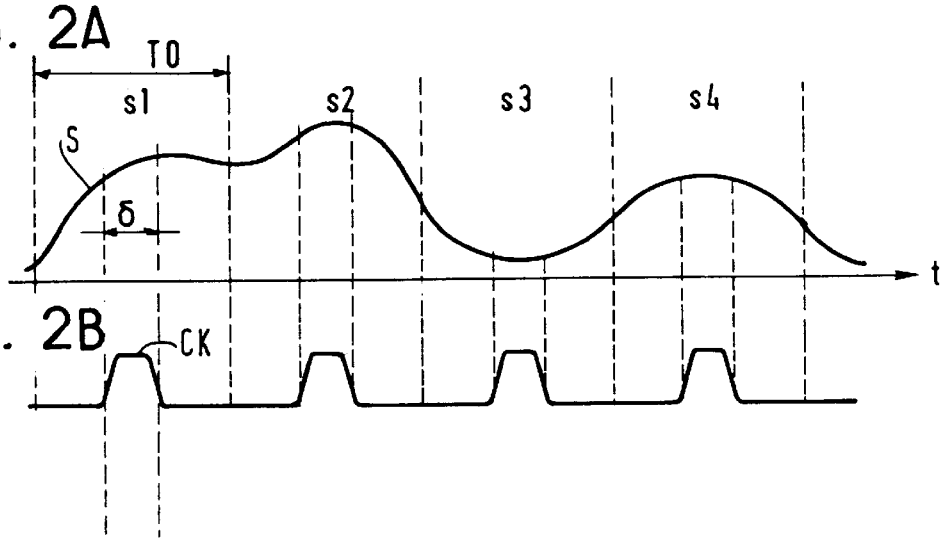
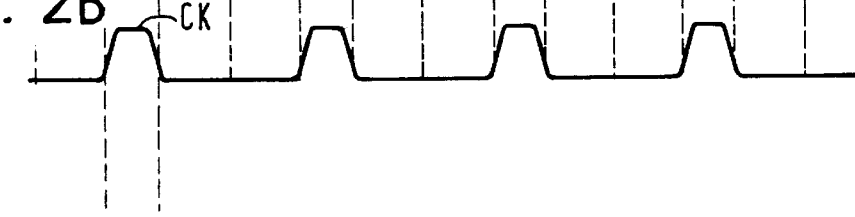
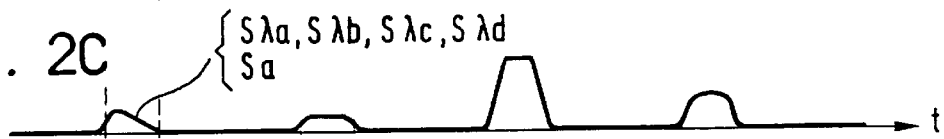
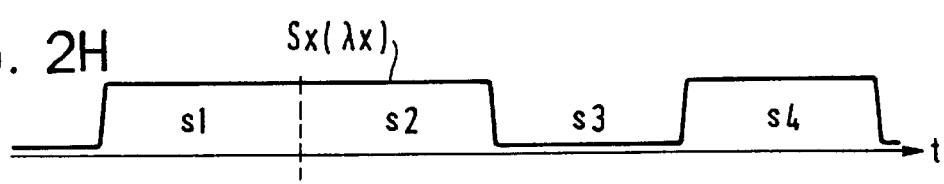

METHOD AND APPARATUS FOR SHAPING A BINARY SIGNAL

The invention relates to optical communications systems in which digital data is transmitted, routed, and processed optically.

BACKGROUND OF THE INVENTION

Generally, the data conveyed in such systems is binary data in the form of pulses clocked at a determined clock frequency. The amplitude levels of the pulses are representative of the binary data. Initially, the pulses are in electrical form, and then they are converted into an optical signal obtained by modulating the power (or the amplitude) of an optical carrier wave.

Prior to feeding the optical signal into the system, it is desirable for the optical pulses making up the signal to be properly adjusted with respect both to phase and to amplitude. However, even if the signal to be transmitted is well adjusted on being generated, in general it is transformed into an optical signal after it has passed through various electrical and/or optical apparatus, the effect of which is to impart fluctuations in amplitude and in phase (jitter). The effect of such fluctuations is to increase receiver error rate, thereby putting a limit on transmission rate and/or distance.

OBJECTS AND BRIEF SUMMARY OF THE INVENTION

An object of the invention is to solve that problem by proposing a method of shaping an optical signal to be transmitted, the shaping being performed entirely in the optical domain, and it being possible to apply the shaping both to an electrical input signal and to an optical input signal.

More precisely, the invention provides a method of shaping an input signal whose amplitude is modulated between high levels and low levels representing binary data contained in successive bit times of duration T0, said method comprising a re-synchronization step consisting in particular in:

forming a number p of sampled signals obtained by amplitude modulating p optical carrier waves having different wavelengths, each sampled signal being constituted by samples in the form of pulses of frequency 1/T0, of determined duration not greater than T0/p, and of amplitude that is a function of the amplitude of the input signal; and forming a re-synchronized signal constituted by a combination of delayed signals obtained by applying delays to said sampled signals such that any two consecutive delayed signals are offset in time substantially by said determined duration.

Thus, the invention makes use of the spectrum dimension of the optical domain to prevent interferometric noise from being created.

In a first possibility, said sampled signals are combined before said delays are applied to them, by making use of their different wavelengths.

In a second possibility, the delays are applied to said sampled signals before they are combined.

Although both of these possibilities operate in equivalent manner in principle, the first possibility makes implementation cheaper, as explained below.

In another variant, said delayed signals are obtained by forming sampling optical signals resulting from said carrier waves being modulated by a sampling clock signal of frequency 1/T0 constituted by pulses of duration substantially equal to said determined duration and of constant amplitude, and then by amplitude modulating said sampling optical signals as a function of the amplitude of said input signal.

In the amplitude domain, a parameter representative of optical signal quality is the extinction ratio which is defined as being the power ratio corresponding to the high levels of the signal divided by the low levels of the signal.

Therefore, in another aspect of the invention, in order to supplement shaping in the amplitude domain by improving the extinction ratio, the method includes equalizing the low and/or high levels of the resynchronized signal.

The invention further provides apparatus for implementing the above-defined method.

The apparatus comprises:

first means for forming a number p of sampled signals obtained by amplitude modulating p optical carrier waves having different wavelengths, each sampled signal being constituted by samples in the form of pulses of frequency 1/T0, of determined duration substantially equal to T0/p, and of amplitude that is a function of the amplitude of the input signal; and second means for forming a re-synchronized signal constituted by a combination of delayed signals obtained by applying delays to said sampled signals such that any two consecutive delayed signals are offset in time substantially by said determined duration.

In a particular embodiment, said first means comprise third means for forming p sampling signals, each of which is constituted by sampling optical pulses carried by respective ones of said different wavelengths, of frequency 1/T0, and of determined duration not greater than T0/p, and fourth means for amplitude modulating said sampling pulses as a function of said input signal.

In the particular case when the input signal is an optical signal, provision is advantageously made for said fourth means to comprise a saturable optical amplifying medium receiving said input signal via a first port, and receiving said sampling signals via an opposite port.

The latter variant embodiment offers the advantage that the saturable amplifying medium performs the two functions of amplitude modulating the sampling signals as a function of the input signal, and of amplifying the resulting signal. In addition, the saturable amplifying medium has an equalizing effect consisting in attenuating any fluctuations in the high levels of the pulses that it delivers. This property is particularly well suited to supplement shaping in the amplitude domain by means of a wavelength converter having an interferometer structure that can receive the re-synchronized signal directly as input, and that delivers an output signal that has been properly reshaped.

BRIEF DESCRIPTION OF THE DRAWINGS

Other aspects and advantages of the invention appear from the following description given with reference to the figures, in which:

FIG. 2 shows timing diagrams making it possible to explain the method of the invention;

MORE DETAILED DESCRIPTION

Figure 1:
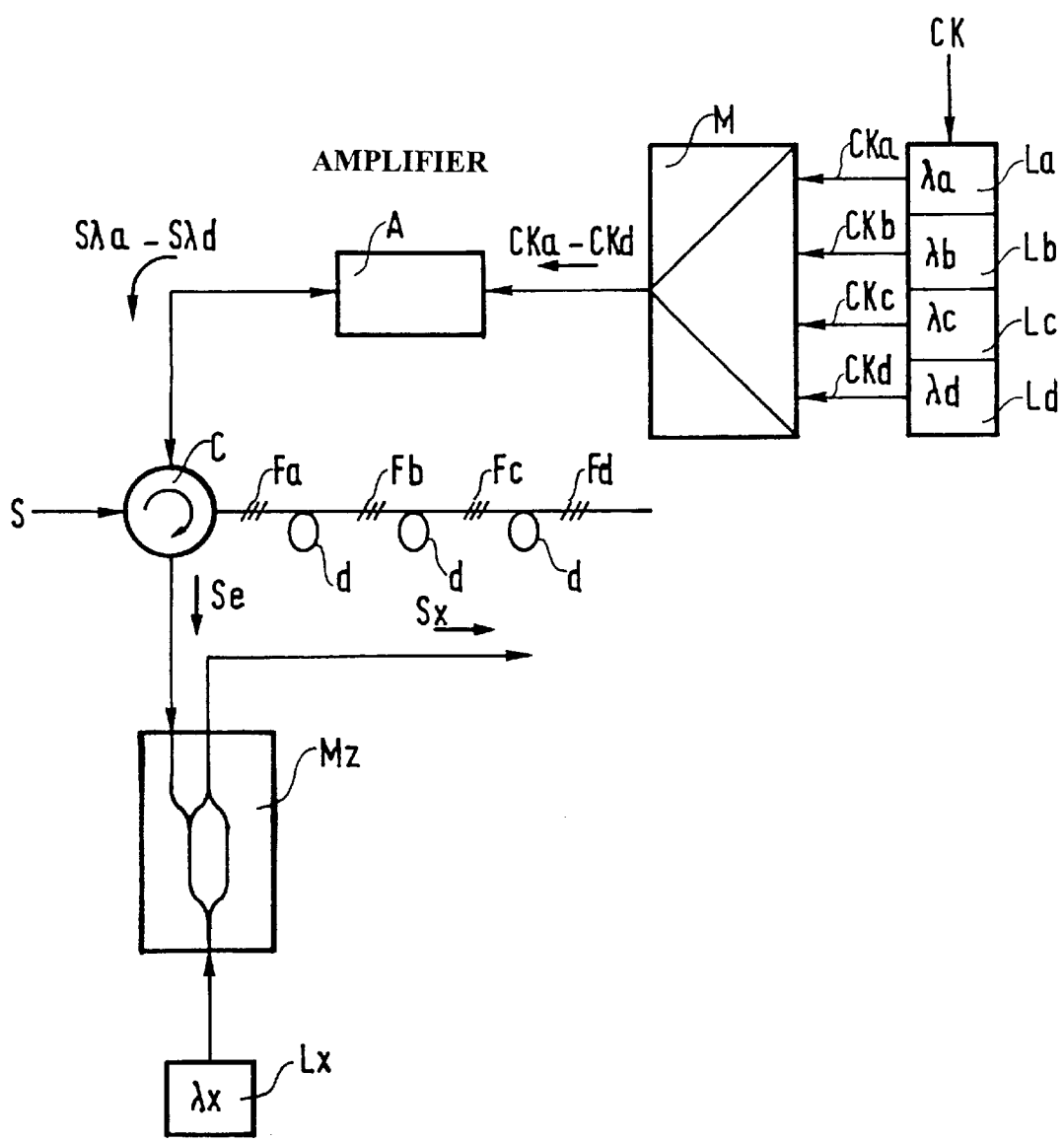
FIG. 1 shows a first embodiment of the shaping apparatus of the invention, when the input signal is an optical signal.

The apparatus shown in FIG. 1 is a first embodiment of apparatus for implementing the method of the invention, when the input signal is an optical signal.

The apparatus includes a first stage suitable for delivering a re-synchronized signal Se on the basis of the input signal S. This stage includes a four-port circulator C. A first port receives the input signal S, a second port is connected to a saturable optical amplifier A, a third port is connected to delay apparatus constituted by filters Fa, Fb, Fc, and Fd connected in cascade via delay lines d, and a fourth port delivers the re-synchronized signal Se.

The amplifier A is provided with a first port connected to the second port of the circulator C, and with a second port opposite from the first port and connected to the outlet of a multiplexer M. The amplifier A is typically a semiconductor optical amplifier, advantageously having stabilized gain.

In the general case, the multiplexer M receives as input p sampling optical signals made up of pulses. By way of non-limiting example, p=4 and the corresponding sampling optical signals CKa, CKb, CKc, CKd are delivered by respective ones of four light sources La, Lb, Lc, Ld suitable for generating carrier waves having different wavelengths. The sources can be modulated by a sampling clock signal CK.

In practice, the sources La–Ld comprise laser oscillators delivering respective carrier waves of wavelengths $\lambda a$, $\lambda b$, $\lambda c$, $\lambda d$. When the signal CK is electrical, the sources La–Ld may be constituted by laser oscillators which are electrically powered as a function of the signal CK. Lasers having integrated modulators may also be used. If the signal CK is an optical signal, the sources La–Ld may be constituted by self-pulsating lasers such as those described in the article entitled "18 GHz All-Optical Frequency Locking and Clock Recovery Using a Self-Pulsating Two-Section DFB Laser", U. Feiste et al, IEEE PHOTONICS TECHNOLOGY LETTERS, vol. 6, No. 1, January 1994.

In the general case, if T0 is the bit time of the input signal S, each sampling optical signal CKa–CKd results from a respective one of the carrier waves being modulated by a sampling clock signal CK of frequency 1/T0 and made up of constant-amplitude pulses of determined duration $\delta$ not greater than T0/p. In the particular case of the input signal S being of the NRZ type, the determined duration $\delta$ is substantially equal to T0/p.

The filters Fa, Fb, Fc, and Fd are stop filters tuned to reflect respective ones of the wavelengths $\lambda a$–$\lambda d$. To take into account the go and return paths of the waves, each of the delay lines d is dimensioned to create a delay substantially equal to one half of said determined duration $\delta$. When the input signal S is of the NRZ type, the delay is T0/2p.

The re-synchronized signal Se is applied to the input of a second stage constituted by a wavelength converter having an interferometer structure MZ associated with a laser oscillator Lx. The interferometer structure MZ shown is of the Mach-Zehnder type. It comprises two branches conveying respective coherent waves output by the oscillator Lx and coupled to deliver the output signal Sx. One of the branches further receives the input signal Se. This branch includes a medium whose refractive index varies as a function of the total optical power that it conveys. Thus, variations in the power of the input signal modulate the refractive index, and the two coherent waves can interfere destructively or constructively as a function of the power level of the input signal. A detailed description of this type of converter is given, for example, in the article entitled "Wavelength Conversion by Optimized Monolithic Integrated Mach-Zehnder Interferometer", C. Joergensen et al, IEEE PBOTONICS TECHNOLOGY LETTERS, VOL. 8, No. 4, April 1996.

Operation of the apparatus shown in FIG. 1 is described below with reference to the timing diagrams a) to h) in FIG. 2.

Timing diagram a) shows an example of how the amplitude of an NRZ-type input signal S varies as a function of time. Said amplitude is modulated between high levels and low levels that represent binary data s1, s2, s3, s4 contained in successive bit times of duration T0. In this example, the signal successively represents the binary data 1, 1, 0, 1.

Timing diagram b) represents the sampling clock signal CK. It is made up of a succession of pulses of duration $\delta$ and of frequency 1/T0. In the general case when a number p of light sources are available, and if a re-synchronized signal is to be delivered that is of the NRZ type as is the input signal S, then the duration 6 is chosen to be substantially equal to T0/p. In the example shown where p=4, $\delta$=T0/4. The signal CK is positioned relative to the input signal S so that the pulses which make it up appear in the vicinity of the middles of the bit times T0.

The sources La–Ld modulated by the signal CK deliver sampling optical signals CKa–CKd (not shown) carried by respective ones of the wavelengths $\lambda a$–$\lambda d$ and whose amplitudes reproduce the amplitude of the signal CK.

The sampling signals CKa–CKb are combined by the multiplexer M, and they are then injected into the amplifier A via its second port. Via its first port, the amplifier A receives the input optical signal S output by the second port of the circulator C. The signal S is thus injected in the opposite direction. Since the amplifying medium is saturable, the gain applied to the signals CKa–CKb is modulated by the amplitude of the input optical signal S. The first port of the amplifier A then delivers sampled signals $S\lambda a$–$S\lambda d$ to the second port of the circulator C, which sampled signals are carried by respective ones of the wavelengths $\lambda a$–$\lambda d$, as shown in timing diagram c).

The sampled signals $S\lambda d$–$S\lambda d$ are applied to the delay apparatus comprising the filters Fa–Fd and the delay lines d via the third port of the circulator C. Since the filters Fa–Fd are stop filters set to respective ones of the wavelengths $\lambda a$–$\lambda d$, and since each of the delay lines d is dimensioned to create a delay equal to T0/2p=T0/8, the delay apparatus delivers to the circulator C the signals Sa–Sd carried by respective ones of the wavelengths $\lambda a$–$\lambda d$, as shown respectively in timing diagrams c) to f). The fourth port of the circulator C then delivers the re-synchronized signal Se which is the superposition of the signals Sa–Sd as shown in timing diagram g).

It can be observed that low levels in the input signal S correspond to high levels in the re-synchronized signal Se, and vice versa. Because the gain of the amplifier A saturates, the high levels of the signal Se are well equalized. However, the low levels of the signal Se still have non-zero power levels, which means that there is room to improve the extinction ratio.

This defect is easy to correct by means of the wavelength converter having an interferometer structure MZ in the second stage. Said second stage then delivers the fully reshaped output signal Sx carried by the wavelength $\lambda x$, as shown in timing diagram h).

It may be noted that the effect of the first stage equalizing the high levels of the re-synchronized signal Se is to stabilize operation of the converter of interferometer structure.

Figure 3:
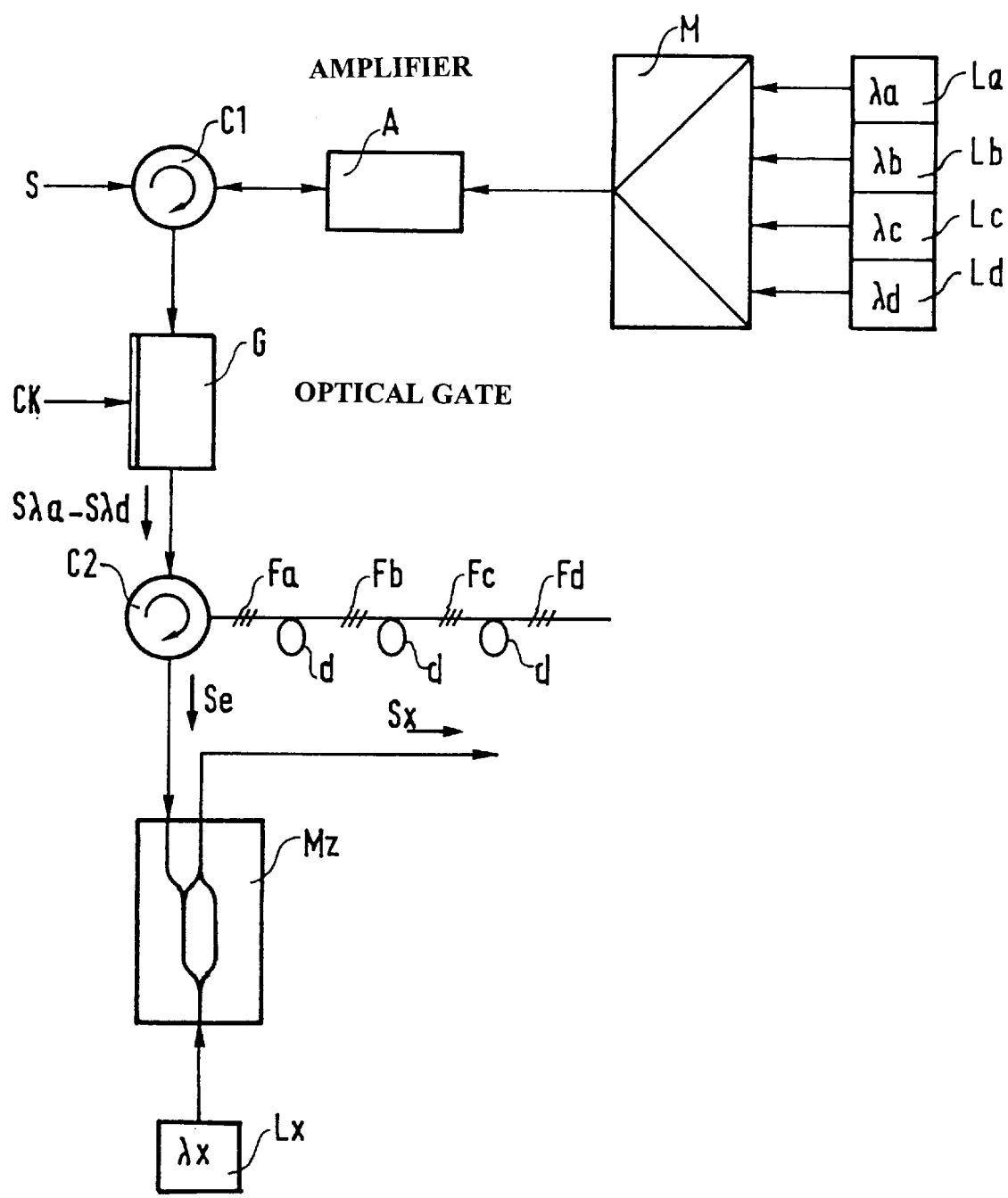
FIG. 3 shows a variant embodiment of the apparatus of the invention.

FIG. 3 shows a variant embodiment of the apparatus of the invention. In this variant, the sources La–Ld deliver continuous carrier waves which are firstly modulated as described above by the input signal S by means of the first circulator C1 and of the amplifier A. The resulting signal is then modulated by the sampling clock signal CK by means of an optical gate G. The optical gate G delivers the above-defined signals $S\lambda a$–$S\lambda d$.

The apparatus shown in FIG. 3 operates identically to the apparatus shown in FIG. 1. This embodiment is simpler, but it suffers from the drawback that clock signal modulation must be applied to signals that have already been amplified by the amplifier A.

Figure 4:
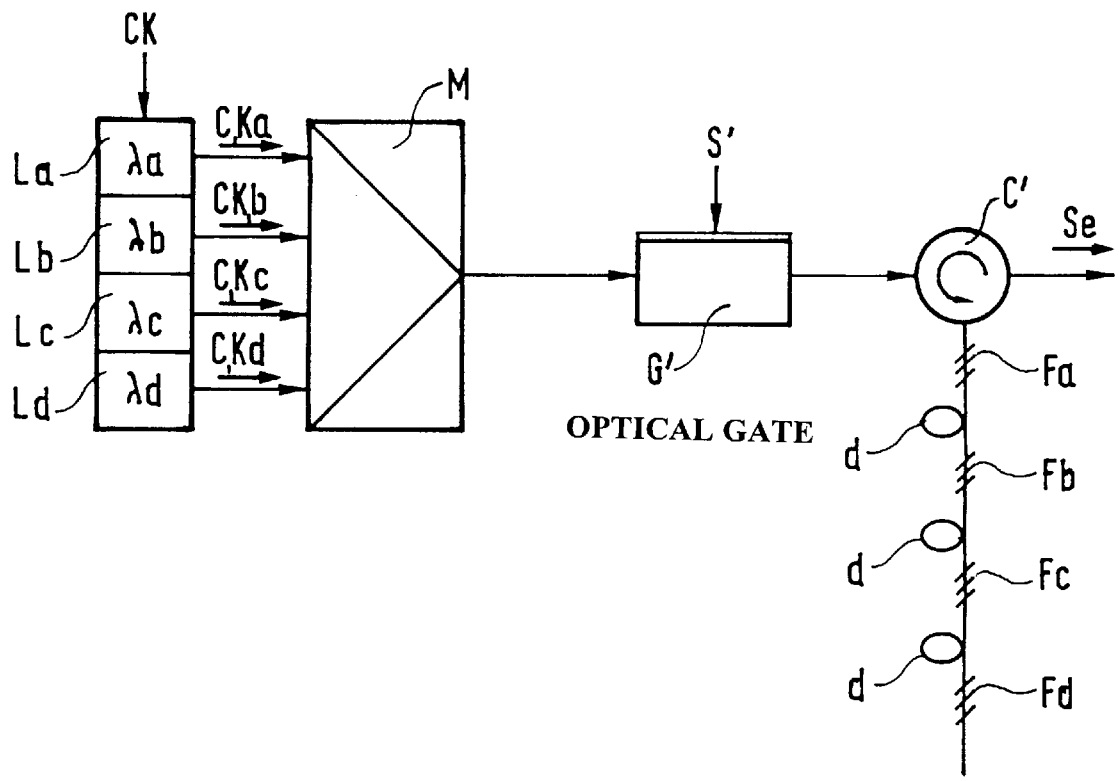
FIGS. 4 and 5 show other variant embodiments of the apparatus of the invention, when the input signal is an electrical signal.

FIG. 4 shows the first stage of another embodiment of the apparatus of the invention that can be used when the input signal S' is an electrical signal.

As above, the apparatus includes a plurality of light sources La–Ld controlled by the sampling clock signal CK and that deliver the sampling signals CKa–CKd to the multiplexer M. The outlet of the multiplexer M is connected to a first port of a circulator C' via an optical gate G' controlled by the input signal S'. A second port of the circulator C' is connected to the above-defined delay apparatus. A third port of the circulator C' delivers the re-synchronized signal Se.

The structure of the apparatus shown in FIG. 4 is analogous to the structure shown in FIG. 1 except that the optical gate G' performs the function of the saturable amplifier A shown in FIG. 1. The two embodiments operate in similar manner, but the embodiment shown in FIG. 4 suffers from the problem of the extinction ratio due to the saturable amplifying medium to a lesser extent and that makes it possible to omit the second stage.

Figure 5:
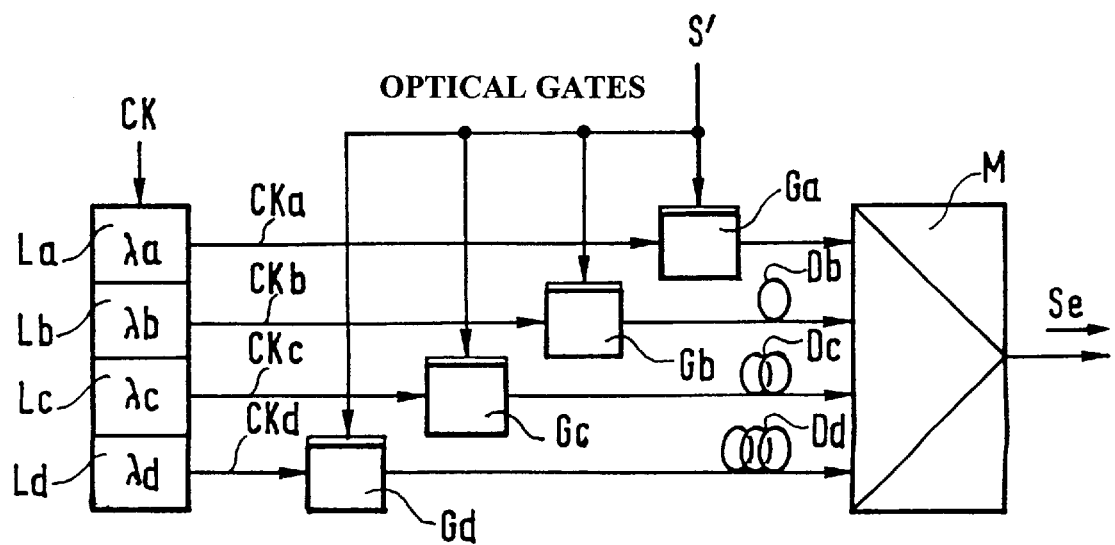

FIG. 5 shows another embodiment of the first stage, also for an electrical input signal S'. As above, the light sources La–Ld are controlled by the sampling clock signal CK to deliver the sampling signals CKa–CKd. The signals CKa–CKd are applied to respective ones of optical gates (semiconductor optical amplifiers operating under linear conditions) Ga–Gd controlled by the input signal S'. The outlets of these gates are connected to the inlets of a multiplexer M via respective delay lines Db, Dc, Dd delivering the desired delays. The multiplexer M outputs the re-synchronized signal Se.

The FIG. 5 embodiment may also be transposed for an optical input signal S (not shown) by replacing the optical gates Ga–Gd with semiconductor optical amplifiers operating under non-linear conditions. In this way, one of the ports of each amplifier receives one of the sampling signals CKa–CKd while the opposite port is coupled to one of the inlets of the multiplexer M and receives a portion of the input signal. For this purpose, it is possible to provide a 1-to-p coupler whose inlet receives the input signal S, and whose outlets are coupled to respective ones of the amplifiers. This variant requires a plurality of amplifiers, but it offers the advantage that it can be made in integrated manner because of the absence of circulators. In a simplified version, the multiplexer M may also be replaced merely by a p-to-1 coupler.

The invention is not limited to the embodiments described above. In particular, the invention covers an equivalent solution which consists in creating delayed signals Sa–Sd by applying delays Db, Dc, Dd to the input signal S and to the sampling clock signal CK, and in sampling the input signals as delayed by respective ones of the corresponding delayed sampling signals. This variant is however less simple to make because it is necessary to delay both the input signal and the sampling signal.

Naturally, the number p of sources may be arbitrary. Thus, p=2 can be sufficient in practice, and is then preferred for reasons of simplicity and of cost.

Similarly, the invention does not relate solely to forming NRZ signals that are reshaped on the basis of NRZ input signals. It makes it possible, for example to deliver NRZ signals on the basis of RZ signals or vice versa.

In addition, the delay apparatus constituted by filters Fa, Fb, Fc, Fd connected together in cascade via delay lines d may be replaced by equivalent apparatus constituted, for example, by a coupler connected in parallel with the filters via suitable different delay lines. This solution makes it easier to adjust the delays, and can be suitable from the point of view of losses if p is small, e.g. equal to 2. It may also be constituted by a circuit operating in transmission and comprising, for example, a demultiplexer connected in parallel with a multiplexer via suitable different delay lines. This solution is more costly but it also makes it easier to adjust the delays.

What is claimed is:

1. A method of shaping an input signal whose amplitude is modulated between high levels and low levels representing binary data contained in successive bit times each having duration T0, said method comprising:

forming a number p of sampled signals, where p is an integer, obtained by amplitude modulating p optical carrier waves having different wavelengths, each sampled signal comprising samples in the form of pulses of frequency 1/T0, of a determined duration not greater than T0/p, and of an amplitude that is a function of the amplitude of the input signal; and forming a re-synchronized signal constituted by a combination of delayed signals obtained by applying delays to said sampled signals such that any two consecutive delayed signals are offset in time substantially by said determined duration.

2. A method according to claim 1, wherein said sampled signals are combined before said delays are applied to them, by making use of their different wavelengths.

3. A method according to claim 1, wherein said delays are applied to said sampled signals before they are combined.

4. A method according to claim 2, wherein said delayed signals are obtained by forming sampling optical signals resulting from said carrier waves being modulated by a sampling clock signal of frequency 1/T0 constituted by pulses of duration substantially equal to said determined duration and of constant amplitude, and then by amplitude modulating said sampling optical signals as a function of the amplitude of said input signal.

5. A method according to claim 1, further comprising an equalization step in which the low and/or high levels of the resynchronized signal are equalized.

6. Apparatus for shaping an input signal whose amplitude is modulated between high levels and low levels representing binary data contained in successive bit times each having duration T0, said apparatus comprising:

first means for forming a number p of sampled signals, where p is an integer, obtained by amplitude modulating p optical carrier waves having different wavelengths, each sampled signal comprising samples in the form of pulses of frequency 1/T0, of a determined duration substantially equal to T0/p, and of an amplitude that is a function of the amplitude of the input signal; and second means for forming a re-synchronized signal constituted by a combination of delayed signals obtained by applying delays to said sampled signals such that any two consecutive delayed signals are offset in time substantially by said determined duration.

7. Apparatus according to claim 6, wherein said first means comprise third means for forming p sampling signals, each of which is constituted by sampling optical pulses carried by respective ones of said different wavelengths, of frequency 1/T0, and of duration substantially equal to said determined duration, and fourth means for amplitude modulating said sampling pulses as a function of said input signal.

8. Apparatus according to claim 7, wherein, when said input signal is an optical signal, said fourth means comprise a saturable optical amplifying medium receiving said input signal via a first port, and receiving said sampling signals via an opposite port.

9. Apparatus according to claim 7, wherein said second means comprise p stop filters tuned to reflect respective ones of said different wavelengths and coupled together in cascade via delay lines, each of which is dimensioned to create a delay substantially equal to one half of said determined duration.

10. Apparatus according to claim 6, including a wavelength converter having an interferometer structure receiving said re-synchronized signal as input and outputting a signal that has been reshaped.

\* \* \* \* \*